Figure 1:
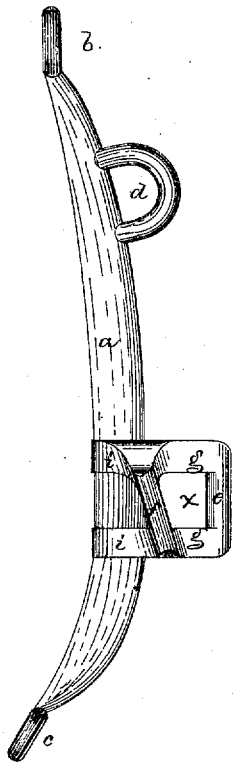

J. HOLT & S. G. CHEEVER

Improvement in Harness-Hames.

No. 5,012. Reissued July 30, 1872.

WITNESSES.

Mc. W. Frothingham.

S. B. Kidder.

INVENTOR.

John Holt.

Simon G. Cheever.

By their Attys.

Crosby & Gould

AM. PHOTO-LITHOGRAPHIC CO. N.Y. (OSBORNE'S PROCESS)

UNITED STATES PATENT OFFICE.

JOHN HOLT, OF CHELSEA, AND SIMON G. CHEEVER, OF BOSTON, MASS.

IMPROVEMENT IN HARNESS-HAMES.

Specification forming part of Letters Patent No. 64,222, dated April 30, 1867; reissue No. 5,012, dafed July 30, 1872.

*To all whom it may concern:*

Be it known that we, JOHN HOLT, of Chelsea, and SIMON G. CHEEVER, of Boston, all in the county of Suffolk and State of Massachusetts, have invented an Improvement in Harness-Hames; and we do hereby declare that the following, taken in connection with the drawing which accompanies and forms part of this specification, is a description of our invention sufficient to enable those skilled in the art to practice it.

This invention is applicable to harness-hames, either of metal or of wood, and for light or heavy work.

In the ordinary construction each hames-iron is made with a draft-pin, at the end of which is a head, and a hole being punched in the end of the trace-strap the pin is passed through the trace-hole and is riveted to the hames-iron, and the trace then draws against the pin. The strain upon the trace weakens it and splits or breaks the leather, so that the draft upon the trace soon causes the pin to break through the trace, seriously injuring, if not utterly ruining, the trace. Moreover, the strain upon the head of the pin sometimes breaks it off, or starts the pin from its socket. The trace has also been connected to the hames-iron by a sort of metal loop having long shanks, to which the trace is riveted. This construction is not only of clumsy appearance, but does not admit of the proper draft, and the loop is soon worn through. In our invention we make the hames-iron with a square draft-eye, around the end bar of which the end of the trace is buckled, or is doubled and stitched, or otherwise fastened. With such construction the trace-strap has an equal bearing entirely across its surface, the strain upon the whole eye-bar is equal, no breakage of eye or strap can occur, and the construction is ornamental. It is in such a construction that our invention primarily consists.

The invention also consists in so locating or arranging the pieces which receive the hold-back straps that the bar or loop of the staple through which the said straps pass, or to which they are secured, shall have a peculiar location and arrangement, the upper end thereof being inclined outward from the front of the hames, and inward toward the adjacent half of the hames, said bar being held by projecting pieces integral therewith at considerable distance from the front of the hames. This angular location or arrangement of the described bar or loop of the holdback-staple causes the holdback-strap to bear fairly upon the length of said bar, while by the projection thereof the strap connected thereunto is kept clear from the roll of the collar, so that the collar is freed from the chafing of the breast-strap.

The invention also consists in forming in one integral piece the means for fastening the holdback-strap and one of the draft-traces, so that the strain exerted on either is sustained by the same means of connection with the hames. Heretofore two separate pieces have been used with each side or half of a hames, one for the holdback-strap and one for the trace, the latter being riveted, forged, or brazed to the hames, and for the former studs bearing loose rings have been riveted to the hames. The riveting to the hames of breast-strap studs with one large central rivet to each weakened the hames very much, often causing breakage of the hames at the rivet-holes therein, and the breast-strap rings, being loose, chafed upon the roll of the collar, soon wearing through the leather by such chafing.

By our invention the bearings of the trace and breast-strap attachments upon the hames are united in one piece for each half of a hames, said piece having feet or flanges by which it is secured, either by riveting or brazing, to that half of a hames to which it is fitted, said feet being made to wholly or partially encompass the outer part of the hames and affording good bearing-surfaces, with room for any suitable fastening. Beside this, the breast attachment is not vibratory, like the ring formerly used, and, as it is set on the proper angle, the strap thereon bears its whole width fairly thereon, and not at the corners alone, and a sufficient projection from the hames is had to keep the roll of the collar from being chafed and worn by the breast-strap.

Figure 2:
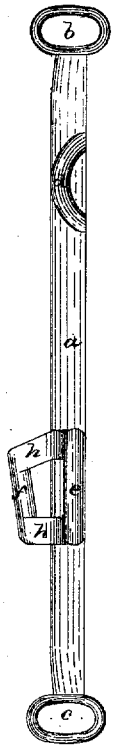

In the drawing, Figure 1 shows a front elevation, and Fig. 2 a side elevation, of one-half or one side of a hames embodying our improvement.

*a* is the bow of the hames; *b* and *c*, the loops or eyes by which the two bows of a hames are secured together at the top and bottom; and *d* is the rein-guide. The trace is secured to the loop-bar *e*, and the breast-strap to the loop-bar *f*, said bars *e* and *f* being, respectively, united by arms *g* and *h* to the feet *i*, which surmount and encompass the hames. Between said feet and the surface of the hames the brazing metal may be fused, or room sufficient for several suitable rivets may be found in said feet. Thus it will be seen that the same fastening answers both for security against strain exerted either on the trace or the breast-strap, as all the parts, *e f g h i*, are but portions of one integral casting or forging. Moreover, it will be seen from inspection of Figs. 1 and 2 how the piece *f* is projected from the hames and is set upon suitable angles so as to clear the breast-strap from the collar.

The formation of the part to which the trace is secured may be modified to receive a button-stud or a clip, to which the trace is directly fastened, instead of being passed directly around the bar *e*.

The end of the trace-strap is passed through the eye *x* and doubled around the bar *e*, and joined to the main part of the strap, being connected thereto by stitching or other suitable fastenings. It will readily be seen that no strain liable to break the strap can be exerted, as the strap is uncut; nor will the draft be liable to break the eye.

To prevent twisting of the strap at the eye, the bar *e* may be set at an angle, so that when the hames-iron is in place the bar stands in vertical position.

We claim—

1. A hame-iron having a trace-attaching eye, formed as shown, and attached to the hame-bar by a plate or by feet surmounting and fitting the curved surface of the hame-bar *a*, and brazed or otherwise firmly secured thereto.

2. The construction of harness-hames with the projecting angular arrangement of the holdback-strap attachment, substantially as described.

3. The combination, in one integral piece, of the breast-strap and trace attachment for harness-hames, substantially as described.

S. G. CHEEVER.
JOHN HOLT.

Witnesses:
FRANCIS GOULD,
M. W. FROTHINGHAM.